(12) United States Patent
Bailey

(10) Patent No.: US 7,205,883 B2
(45) Date of Patent: Apr. 17, 2007

(54) TAMPER DETECTION AND SECURE POWER FAILURE RECOVERY CIRCUIT

(75) Inventor: Doug Bailey, Kanata (CA)

(73) Assignee: Safenet, Inc., Belcamp, MD (US)

(*) Notice: Subject to any disclaimer, the term of this patent is extended or adjusted under 35 U.S.C. 154(b) by 294 days.

(21) Appl. No.: 10/265,127

(22) Filed: Oct. 7, 2002

(65) Prior Publication Data
US 2004/0066274 A1    Apr. 8, 2004

(51) Int. Cl.
*H04Q 9/00* (2006.01)
*H04L 9/00* (2006.01)
*G06F 17/00* (2006.01)
*G06K 5/00* (2006.01)

(52) U.S. Cl. ............ 340/5.3; 713/179; 713/185; 235/375; 235/382

(58) Field of Classification Search .......... 340/5.3; 713/179–185; 235/375–382
See application file for complete search history.

(56) References Cited

U.S. PATENT DOCUMENTS

| 3,789,165 | A | * | 1/1974 | Campanella et al. .. 379/406.11 |
| 4,908,608 | A |   | 3/1990 | Reinke et al. |
| 5,278,547 | A | * | 1/1994 | Suman et al. ............ 340/5.22 |
| 5,875,248 | A | * | 2/1999 | Lewis ....................... 713/168 |
| 5,949,882 | A | * | 9/1999 | Angelo ..................... 713/185 |
| 5,970,227 | A | * | 10/1999 | Dayan et al. .............. 713/200 |
| 6,026,492 | A | * | 2/2000 | Cromer et al. ............ 713/202 |
| 6,088,450 | A | * | 7/2000 | Davis et al. ............... 713/182 |
| 6,273,339 | B1 | * | 8/2001 | Tuttle et al. ............... 235/492 |
| 6,282,656 | B1 | * | 8/2001 | Wang ....................... 713/201 |
| 6,317,028 | B1 |   | 11/2001 | Valiulis |
| 6,515,574 | B1 | * | 2/2003 | Herbert et al. ............. 340/5.3 |
| 6,778,066 | B2 | * | 8/2004 | Smith ....................... 340/5.61 |

* cited by examiner

Primary Examiner—Jeffery Hofsass
Assistant Examiner—Scott Au
(74) Attorney, Agent, or Firm—Venable LLP; Caroline J. Swindell

(57) ABSTRACT

A security system including a token and a host system. The token includes volatile random access memory for storing security data for use during a step of secure authentication, an interface for providing communication with a host system when coupled thereto, and a processor. The processor performs the steps of authenticating a host system and the token, providing secure information to the host system upon authentication therewith, and re-authenticating the host system and the token in response to receipt of the secure information after a reset of the token has occurred.

18 Claims, 7 Drawing Sheets

TAMPER DETECTION AND SECURE POWER FAILURE RECOVERY CIRCUIT

The present invention relates to managing a security system in case of power outage, and more specifically, to an automated system for re-authenticating to security devices absent a presence of an authorized user when power is restored.

BACKGROUND OF THE INVENTION

Secure servers are sensitive devices, which monitor various external and internal parameters to ensure that security offered by the secure server is not compromised. For instance in the case of an electrical power outage, an ideal secure server would determine whether a power outage occurred, or whether the secure server has been tampered with. Absent this feature, the secure server will assume tampering and will, therefore, block further operations. In order to ensure security of servers, a standard has been developed setting out what is typically required to maintain system security. The Federal Information Processing Standard 140-1 (FIPS 140-1) has several levels of standard security. For FIPS 140-1 level 3 compliance (FIPS 140-1/L3), a physical presence of the authenticating individual is required. This standard is met, for example, by requiring a biometric, a secure physical key, or both in order to authenticate. The physical key is typically stored in a safe place, such as a safety deposit box or vault. Often these "safe" places are not accessible 24 hours a day 7 days a week.

Of course, since the security officer must be present to re-authenticate to the server in order to commence operation thereof, this employee cannot travel or be far from the office. The more employees are authorised to re-initialise the server, the greater is the potential security threat. As such, a small number of employees, who qualify under high-level security clearance, is preferred. Further, and of greater concern, the officer is greatly inconvenienced every time there is a power outage. With power problems in some places being a significant occurrence, this inconvenience may become a key issue in locating businesses or in the selection of a lesser level of security.

In secure servers supporting FIPS 140-1/L3, a form of protection is built in, which requires they be re-initialized by a security officer—typically a high security level employee—once power is restored. This step is commonly referred to as primary authentication. The re-initialization allows the security officer to verify the system as to ensure that tampering has not occurred. Typically, when such an event occurs, the security officer receives a call from a security guard of the company asking him to come to the company in order to achieve full secure system recovery such that secure server functionality is re-established. Of course, this type of event is likely to occur at any time, including the most inconvenient times of the day or year, as for example in the middle of the night during a snowstorm in winter. Disruptions in functioning of the security server are costly to the company.

In U.S. Pat. No. 6,317,028 to Valiulis, issued Nov. 13, 2001, a personal computer is utilized to coordinate security features. The personal computer periodically transmits a security code over the electric power distribution network to maintain all appliances coupled thereto in an operational state. Such an application fails to meet FIPS 140-1/L3, since another computer authenticates all devices automatically. Clearly, the condition that human authorization is required to initiate secure services on each computer is not met. Tampering with the authentication computer results in a security breach on every computer implemented with such architecture.

U.S. Pat. No. 4,908,608, to Reinke et al., issued Mar. 13, 1990, discloses a computer alarm system that is mounted on an integrated circuit card slidably installed within an empty expansion slot, standard on most computers. The prior art teachings are illustrated in FIG. 1. The alarm system sounds an alarm when the computer's power supply is interrupted or shut off, or when the computer is physically moved causing horizontal or vertical level sensing switches to close. Unfortunately the alarm system does not reduce the overall inconvenience to the high security level individual.

It would be advantageous to have at one's disposal a security system that meets FIPS 140-1/L3, and at the same time does not always rely on an in-person re-authentication to restart the server after, for example, a power outage has occurred. Such a system, once a security officer has performed a primary authentication according to FIPS 140-1/L3, should be able to perform a re-authentication or secondary authentication without the need of a security officer being present in some predetermined circumstances.

OBJECT OF THE INVENTION

It is an object of the instant invention to provide a security system on a secure server that does not require an in-person re-authentication to restart the server after a power outage has occurred.

It is a further object of the instant invention to provide a security system that detects tampering and removal thereof.

SUMMARY OF THE INVENTION

In accordance with the invention there is provided. A security system, which includes a token, the token comprising volatile random access memory for storing security data for use during a step of secure authentication; an interface for providing communication with a host system when coupled thereto; and a processor. The processor performs the steps of authenticating a host system and the token, providing secure information to the host system upon authentication therewith, and re-authenticating the host system and the token in response to receipt of the secure information after a reset of the token has occurred.

In accordance with the present invention, there is further provided a method for secure re-authentication of a secure server comprising the steps of transmitting a password from a host system to a token for authenticating to the token, receiving key data in response to the transmitted password and provided by the token, storing the key data on the host system in non-volatile random access memory thereof, securing re-authentication data within the token based on the key data provided to the host system, storing the secured re-authentication data in RAM within the token, and upon a power failure resulting in a power outage to the host system, providing the key data from the host system to the secondary authentication recovery including sending login information from the host system to the token, and comparing the login information with the re-authentication data stored on the token.

In accordance with another aspect of the invention there is provided a security system, which includes a token, the token comprising volatile random access memory for storing security data for use during a step of secure authentication an internal voltage source for providing a supply voltage to the security system for a predetermined amount of time, when an external voltage source providing a supply voltage to the security system is disrupted, an interface for providing communication with a host system when coupled thereto, a tamper detection device for detecting an absence of a ground connected to the token and for providing a tamper signal when a ground is detected as absent, and a volatile random access memory clear circuit for clearing the security data within the volatile random access memory in response to the tamper signal.

In accordance with another aspect of the invention there is further provided a method for secure re-authentication of a secure server comprising the steps of storing re-authentication data within memory within a token, detecting a presence of a ground coupled to the token, and when a ground is other than coupled to the token, erasing the re-authentication data within the memory

BRIEF DESCRIPTION OF THE DRAWINGS

A preferred embodiment of the instant invention will be described in conjunction with the following drawings, in which.

DETAILED DESCRIPTION OF THE INVENTION

The instant invention will now be described with reference to one specific embodiment thereof. Of course, the invention is not restricted to a specific hardware device, which will be described in the following, nor is the invention restricted to one particular software solution regarding the problems of secondary authentication initialization, secondary authentication set-up, and secondary authentication recovery. Various modifications to the disclosed embodiments will be readily apparent to those skilled in the art, and the general principles defined herein may be applied to other embodiments and applications without departing from the spirit and the scope of the invention. Thus, the instant invention is not intended to be limited to the embodiment disclosed, but is to be accorded the widest scope consistent with the principles and features disclosed herein.

A secure system for a secure server illustrating a preferred embodiment of the instant invention comprises a hardware component, namely a tamper detection circuitry (TDC) and a secure system housing, as well as appropriate software and procedures for secondary authentication, designed to meet the requirements of FIPS 140-1/L3. The hardware components protect a key card (KC) from being tampered with, and prevent any other forms of a severe security breach. For example, the TDC is used to erase from memory on the KC data necessary for secondary authentication. This is achieved either with an active circuit or by discharging the power source used to maintain the data in RAM. Together with the appropriate procedures, this allows the server to be security re-authenticated according to the standards outlined in FIPS 140-1/L3, without a security officer or any other authorized personal being present.

The key card (KC) is connected via a peripheral component interface (PCI) slot to the server system, and is located within the secure boundaries of the security system. The tamper detection circuitry provided within the security system sends out a tamper signal, when any of the following tamper events occur: cover removal, housing case removal, ground plane removal and card removal.

Figure 1:
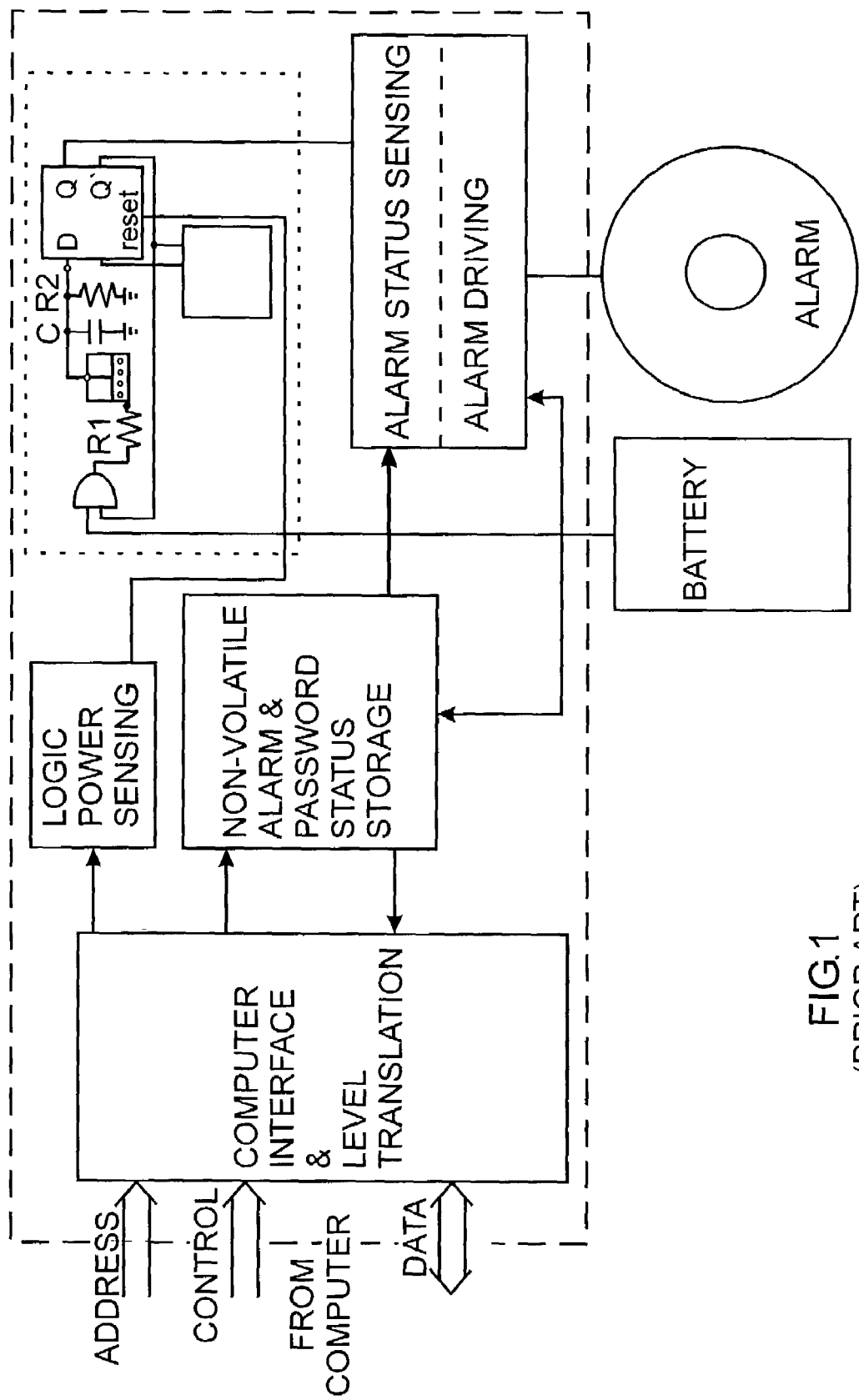
FIG. 1 shows an electronic schematic block diagram of the alarm security device according to prior art.
Figure 2:
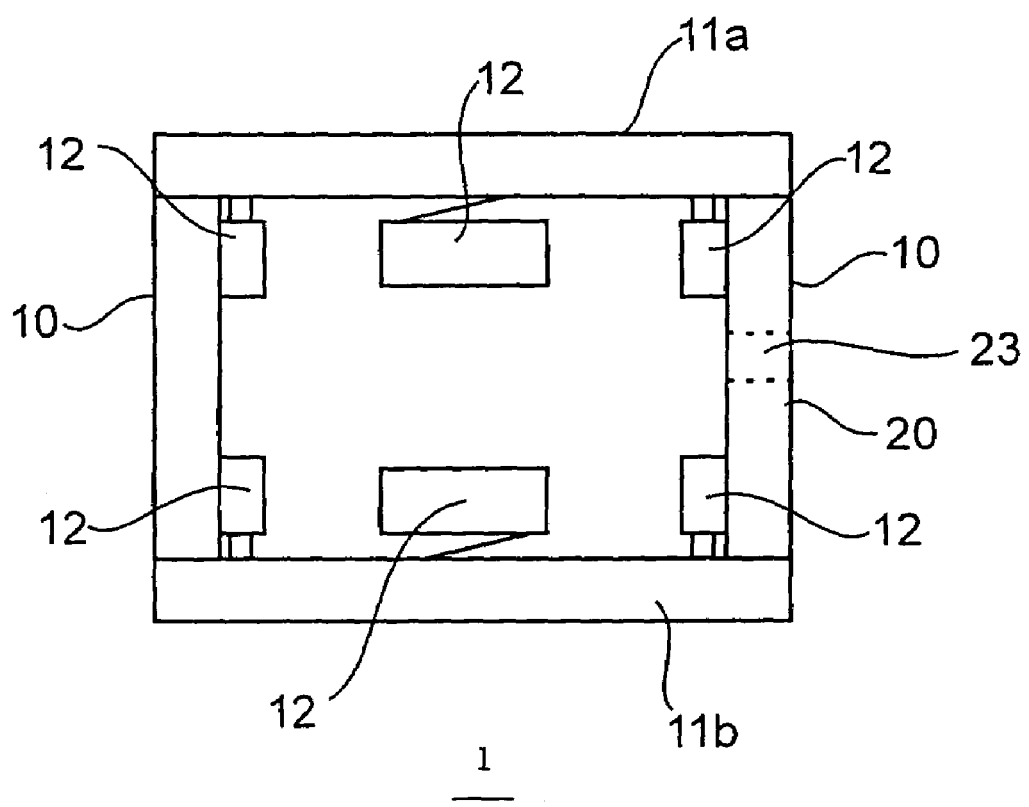
FIG. 2 displays a schematic side view of a security system housing featuring pushbutton switches.

Referring now to FIG. 2, a side view of the secure system housing 1 is displayed. The secure system housing 1 comprises two cover pieces; a top-lid cover piece 11a and a bottom-lid cover piece 11b, coupled to a frame piece 10. The frame piece 10 has a first top edge and a second bottom edge. Attached to the frame piece 10 are eight normally open pushbutton switches 12. Out of the eight pushbutton switches 12, four switches operate as top-lid switches, and are disposed along the first top edge of the frame piece. The remaining four switches operate as bottom-lid switches, and are disposed along the second bottom edge of the frame piece. Each of the top-lid and bottom-lid switches is attached to the frame piece so that it forms an open circuit when no lid cover piece is attached to the frame piece 10, and a closed circuit when a lid cover piece is attached to the frame piece 10.

Figure 3A:
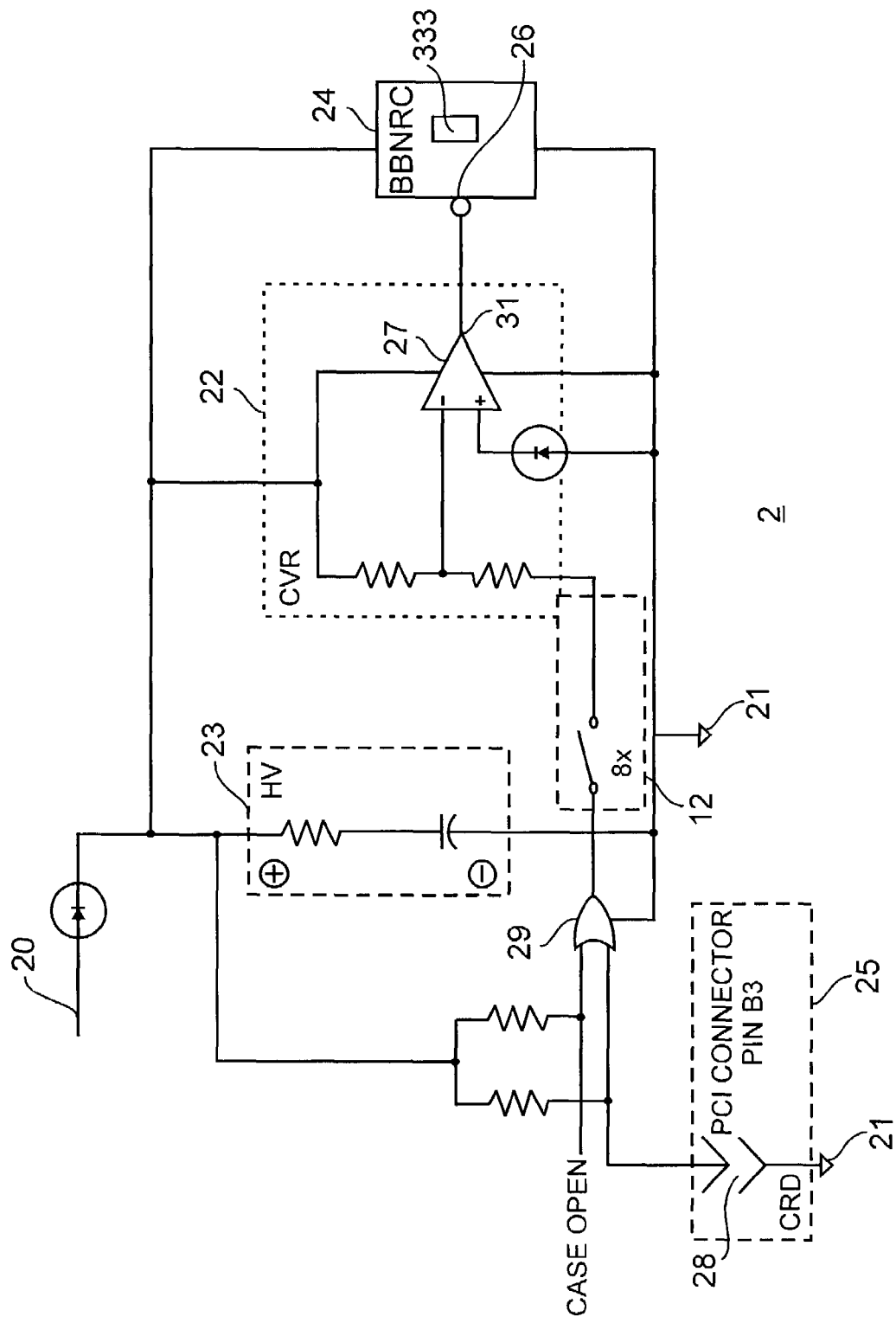
FIG. 3a shows an electronic schematic block diagram for tamper detection circuitry.

Referring to FIG. 3a, a schematic diagram of an example for the tamper detection circuitry (TDC) 2 is shown. The secure system housing 1 encloses the TDC 2 and the key card. For coupling the TDC 2 to a voltage supply, a positive port 20 is provided; various ground ports 21 serve as complementary ports. The TDC comprises a variety of circuits, each of which has a special function in generating a tamper signal by the TDC 2. These circuits are a comparator and voltage reference (CVR) circuit 22, a hold-up voltage (HV) circuit 23, a serialized real time clock controlling a battery-backed non-volatile random access memory (NVRAM) with clear function, which is referred to as BBNRC 24, and a card removal detection (CRD) circuit 25.

In the TDC example as shown in FIG. 3a, low voltage circuitry is used and therefore the TDC 2 operates at a voltage of 3.3V, where this positive voltage is applied to the positive port 20, with respect to a ground source applied to the ground ports 21. Between the ground ports 21 and the positive port 20, the HV circuit 23 is coupled in parallel via a HV positive port and a HV negative port, where a forward biased diode is disposed in series with the positive port 20 and the HV positive port. Within the HV circuit 23, the combination of a capacitor in series with a resistor is coupled to these input ports, the capacitor for storing a substantial portion of the potential applied to the ports of the HV circuit 23. The HV circuit 23 has a dual function within the TDC 2: First, it provides a voltage source to the circuit in case the voltage supply is removed as a result of a tamper event, and second, it provides a positive bias for a logic circuit 29. Within the TDC 2, a circuit path is formed from a ground port 21 to a card removal switch 28, disposed within the CRD circuit 25, with the card removal switch output port coupled to a first input port of the logic circuit 29. The first and second input ports of the logic circuit 29 are coupled through pull-up resistors to the HV positive port. The logic circuit 29 output port is further coupled through a bias resistor to a comparator unit 27, the bias resistor and the comparator unit 27 being disposed within the CVR circuit 22. The CVR circuit 22 negative input port is further coupled through a pull-up resistor to the HV positive port. A comparator output signal is provided through a comparator output port 31 to a RAM clear input port (RCLR) 26 on the BBNRC 24. The BBNRC 24 is also coupled to the HV positive port as well as the HV negative port.

The BBNRC 24 serves as serialized real time clock with NVRAM control. An example for BBNRC 24 is for example the DS1689 by Dallas Semiconductors. Within the BBNRC provided non-volatile random access memory (NVRAM) 333, for example 114 bytes user NVRAM in case of the DS1689, and a NVRAM clear function for clearing the non-volatile random access memory. The NVRAM clear function is enabled or disabled via a NVRAM_CLEAR_ENABLE bit. When this bit is set, the clear function is performed within the BBNRC regardless of the condition of whether voltage is applied to a BBNRC voltage control circuit $V_{CC}$ pin. The importance and the function of the BBNRC 24 will become apparent, when software procedures related to the operation of the security device are explained in more detail.

In final assembly of the secure system housing 1, the top-lid cover piece 11a and the bottom-lid cover piece 11b are attached to the frame piece 10 of the secure system housing 1, depressing the pushbutton switches 12, and forming a closed circuit. In use, the CRD circuit 25 uses a normally ground pin to indicate that a key card is present within the secure system housing 1. When the key card is present, a card removal switch 28 is closed and therefore the second input port to the logic circuit 29 is pulled to logic 0. In the event of the card being removed, the holdup voltage stored in the HV circuit 23 allows the normally grounded pin to be pulled by a resistor to the holdup voltage, while maintaining power on the TDC 2. Once the second input port is pulled to logic 1, the tamper event is recognized, and the user NVRAM 333 provided within the BBNRC is erased. Equally, if either the top-lid cover piece 11a or the bottom-lid cover piece 11b is removed through a tamper event, then any of the open switches will cause the TDC 2 to generate a tamper signal, and user NVRAM 333 provided within the BBNRC is erased.

Figure 3B:
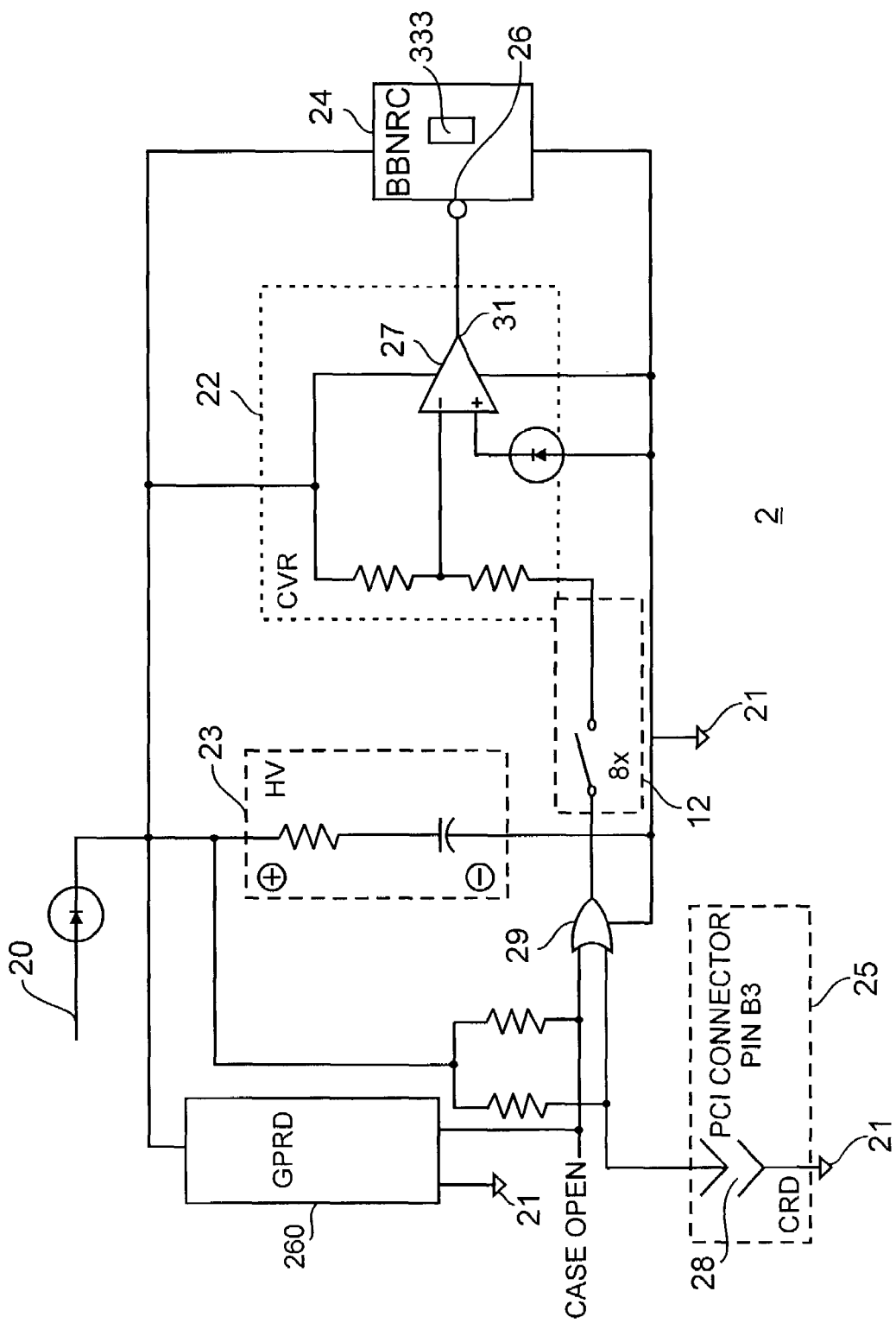
FIG. 3b shows an electronic schematic block diagram for tamper detection circuitry including ground plane removal detection.

Referring now to FIG. 3b, a schematic diagram of an example for the tamper detection circuitry (TDC) 2 is shown, which includes a ground plane removal detection (GPRD) circuit 260. The GPRD circuit 260 is connected to the HV circuit 23, and serves to detect the presence of a ground plane when coupled thereto The means of tamper detection implemented through the various switches and circuits in the TDC 2 are very viable, and provide for detection of a tamper event directed at the secure server as well as to the key card itself. Unfortunately, if the secure server is removed from its location and tampered with at a remote location, then generation of the tamper detection signal by the TDC 2 is of no use. An unscrupulous party, knowing the internal functioning of the secure server, may possibly devise a scheme for blocking the TDC 2 from reading the lid switches as well as from reading whether the key card is installed if given sufficient time. Therefore the ground plane removal detection (GPRD) circuit 260 is added to the TDC 2. The GPRD circuit 260 of the TDC 2 advantageously provides a circuit for detecting the presence of a ground plane. In this manner, if the secure server is disconnected from the power supply, the GPRD circuit 260 will detect the removal of the ground plane and provide a tamper signal to the BBNRC. The tamper signal is input to the RCLR port 26 on the BBNRC and clears the BBNRC internal RAM when the tamper event occurs.

Before describing in detail the protocols and procedures utilized in connection with the TDC 2, it is helpful to define scope and function of the key card (KC). The KC comprises FLASH memory (FLASH), RAM and NVRAM memory elements, and securely stores data and keying material inside its cryptographic boundary. It also performs cryptographic operations on data provided by external applications using the keying material stored in the KC. These abilities are defined as key management, object management, and cryptographic capability. Before using a KC to perform any cryptographic or management functions, a user provides a valid operator identity as well as a valid authentication code to the KC. The KC then processes these two input codes during a login operation. When this operation has completed successfully, the key card (KC) allows the user to perform operations based on predefined policy settings.

The KC is able to distinguish two categories of users, namely super-user and normal user. The super-user category is referred to as the "security officer" (SO), and the normal user category is referred to as the "user." Preferably, a KC has only one SO. The SO is allowed to perform all of the cryptographic, key and object management functions, as well as a set of so called SO functions, all provided by the KC. The SO functions are available only to the SO, and allow the SO to manage KC users and security policies. All users are subjected to the same policy settings established by the SO.

A vector that is loaded on the KC during manufacturing thereof defines a first level of security. This fixed policy vector (FPV) establishes security policies that are not for modification after manufacturing. A preferred format for the FPV is a 32-bit vector divided into four fields of eight bits each. The FPV contains settings necessary to enforce policy rules that apply across a wide range of KC users. The FPV remains in place until the key card is destroyed or its firmware erased. The integrity of the FPV is maintained through a same mechanism used to protect executable code from being modified. Preferably, a 32-bit cyclic redundancy check (CRC) computation is used to achieve this goal.

The second level of security is provided by a token policy vector (TPV), which optionally is modified by the SO. The TPV contains the settings necessary to enforce local policy rules. Its contents are used by KC internal code to validate the operations performed by a user. A preferred format of the TPV is a 32-bit vector divided into four fields of eight bits each.

Other methods of security management are easily envisioned. For example, the first level of security is possibly represented by a capability set (CS), whereas the second level of security is represented by a policy set (PS). In comparison to the aforementioned concept involving FPV and TPV, at a very high level, CS elements take the place of FPV bits, and PS elements take the place of TPV bits. A primary difference is that CS elements are possibly changed through software licenses, whereas FPV bits of are typically locked once a product was manufactured. The instant invention will be described with reference to FPV and TPV, but CS and PS, as well as other related concepts are not to be excluded.

According to the functionalities of the TDC 2 as described above, if the secure system for a secure server is tampered with or removed from the ground plane, then the tamper signal is generated. However, if there is a power failure, then a requirement of the secure server is to achieve full system recovery without manual user intervention. It is further required that complete authentication is attainable using only data that is available to the secure server protected by the secure system. This form of re-authentication is referred to as secondary authentication (SAU).

Since the very nature of the SAU mechanism weakens a security model realized for a secure server, the SAU feature is preferably controllable through policy bits in the TPV and FPV on the key card. Also, since the SAU mechanism is intended to survive power failure, state information is preferably maintained in non-volatile store so that it is possible to proceed with the recovery when power is restored. The store in question is the NVRAM 333 contained within the BBNRC 24, which is cleared automatically by any attempt to tamper with the secure server or the KC, for example removing the KC from its PCI slot. The HV circuit 23 keeps the NVRAM valid for several hours, without it being cleared.

The SAU is performed according to a SAU protocol. In order to be as generic as possible, it is preferred that the SAU protocol is as cryptographically strong as possible, including different configurable levels of security in its design. The terms "token" and "host" are used in the description below. According to the embodiment of the instant invention, the "token" is to be identified with the KC, whereas the "host" is to be identified with the secure server including the secure system.

A basic security element in the SAU protocol is a secret key, the so-called secondary authentication key (SAK), which is shared between the host and the token. Optionally, the SAK is regenerated as necessary. Preferably, because of the overhead of generating and distributing the SAK, it is intended to be a long-lived value, generated once and left intact. The SAK is stored as a parameter in FLASH memory on the key card (KC). It is generated automatically when the KC is initialized, and it is regenerated on request. Various methods of distribution of the SAK are possible, depending on a security level imposed by TPV bits stored on the key card (KC). The security officer (SO) therefore controls how secure the final solution is, optionally trading off security for convenience.

In order for the SAU protocol to proceed, the SAK generated on the token is duplicated onto the host. Two options are available for duplicating the SAK, namely transfer of the SAK to another hardware device, or less secure wrapping using a prompt-by-example (PBE) derived key. Control of who is allowed to initiate a SAU recovery is maintained by controlling access to a copy of the SAK. If it is only allowed for the SAK to be securely duplicated to another token being part of the secure server network, then it is most likely that any successful secondary authentication originated from an appropriate host, which in turn was authorized in a primary authentication procedure. Since the primary authentication procedure complies with FIPS 140-1/L3, it follows that the secondary authentication also complies with FIPS 140-1/L3.

When cloning the SAK to another token, a possibly wrapped data blob associated with the SAK is passed to the host cryptographic hardware device and either converted into a data object or copied as a parameter. Thus two tokens are possibly set up to use the same SAK by cloning the parameter from one token to another. Optionally, a hardware device is created, which manages SAK values for multiple tokens and thus acts as a central administration point.

When duplicating the SAK to a software-based host, the SAK will be wrapped using any wrapping-capable key on the token. For example, the user generates a key using a PBE-based key derivation mechanism to create a wrapping key on the token. Once the wrapped data blob is obtained on the host system, the wrapping key is recreatable on the host system using the prompted example that was used to create the wrapping key on the token. The recreated wrapping key is then used to unwrap the data blob, thus providing the host with a duplicate of the SAK generated on the token. Once the SAK is obtained, it is highly advantageous to store it in a non-volatile storage medium.

Figure 4:
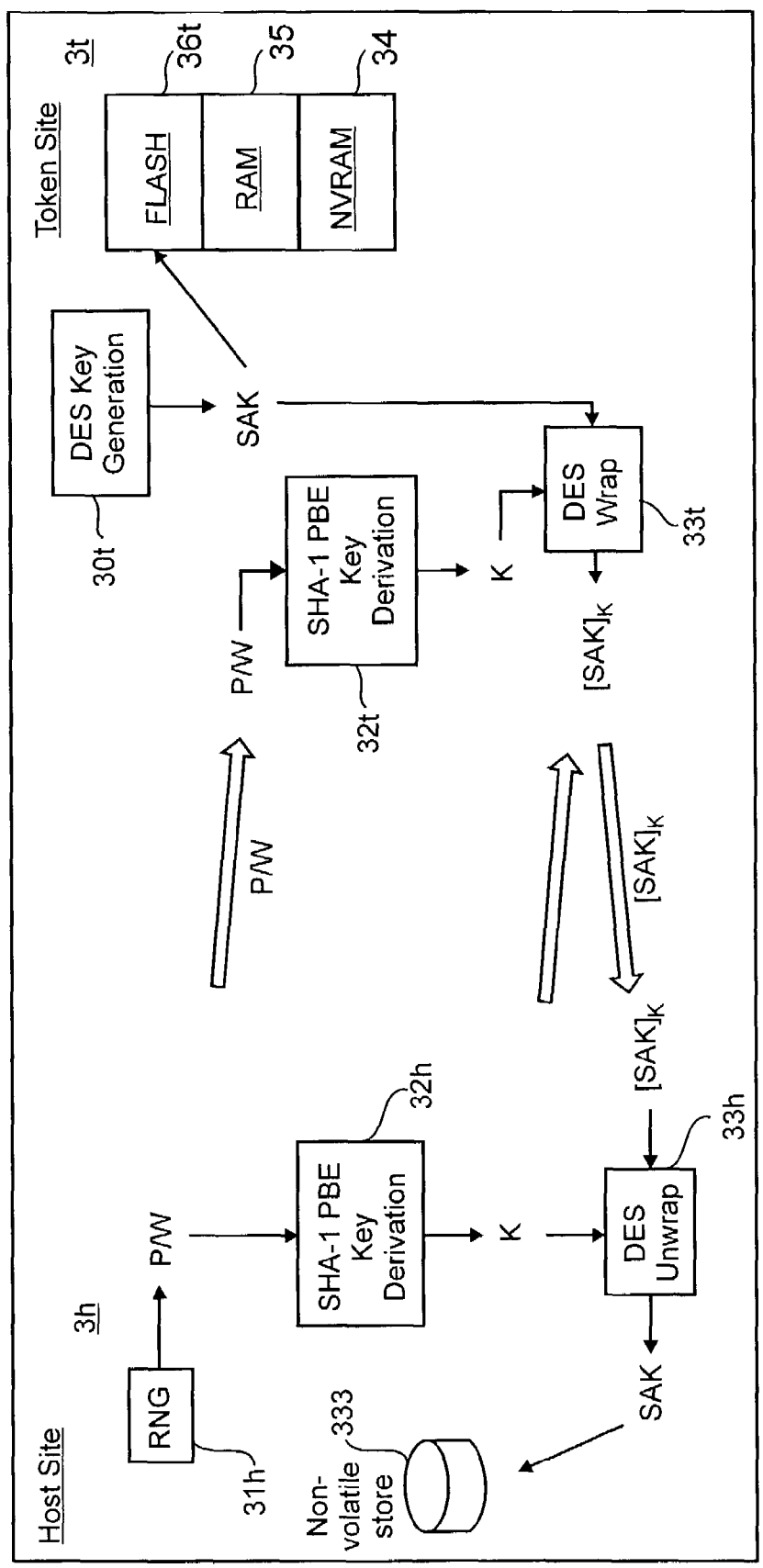
FIG. 4 displays a chart illustrating the procedure of secondary authentication initialization.

Referring now to FIG. 4, an exemplary procedure for secondary authentication initialization according to the preferred embodiment of the instant invention is outlined. On the host site 3$h$, a random number generator 31$h$ provides an initial password (P/W), which is transferred to the token site 3$t$, and distributed. The token is initialized, and following the US data encryption standard (DES), a SAK is created, 30$t$. The SAK then is stored in FLASH memory 36$t$. Further, the password retrieved from the host system is used to create a wrapping key K, following a secure hash algorithm/prompt by example derivation, SHA-1 PBE, 32$t$. In a DES wrapping step, 33$t$, the SAK is wrapped using key K to produce a K-wrapped secondary authentication key $[SAK]_K$. The $[SAK]_K$ is transmitted to the host site, where the key K was reproduced using the same P/W sent out to the token site, and using the same SHA-1 PBE derivation, 33$h$. A DES unwrap procedure, 33$h$, recovers the secondary authentication key by K-unwrapping of $[SAK]_K$. The SAK is then stored in the NVRAM 333.

Figure 5:
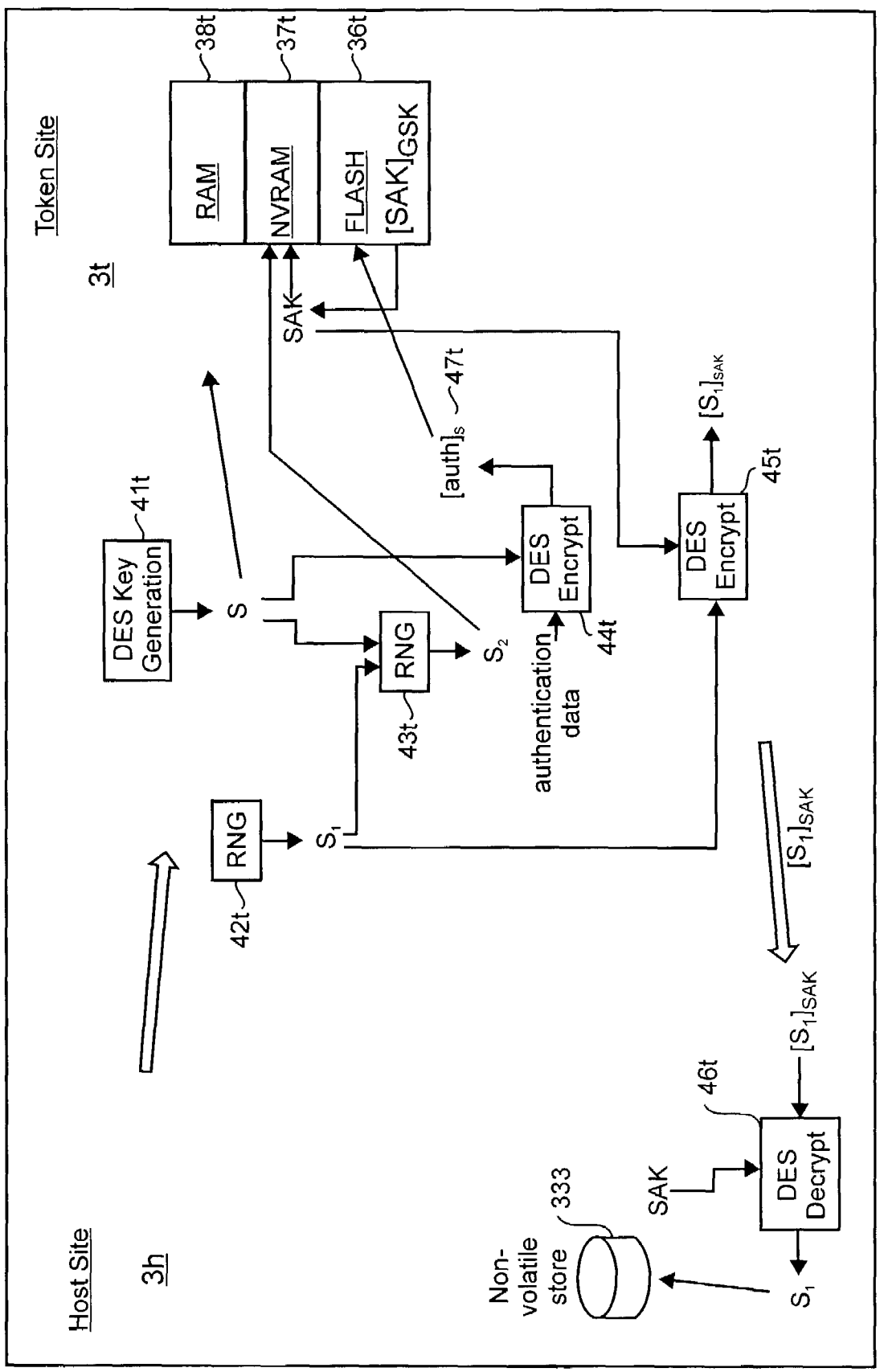
FIG. 5 displays a chart illustrating the procedure of secondary authentication set-up.

In order to recover the secure server after a subsequent power failure, some preparations are performed. Referring now to FIG. 5, an exemplary procedure for secondary authentication set-up according to the preferred embodiment of the instant invention is outlined. The host site 3$h$ issues a request for secondary authentication to the token site. This request initializes the DES generation of a new key S, 41$t$, if it does not already exist, and further initializes the generation of a random split key $S_1$, 42$t$. After S is generated, it is stored in volatile random access memory, RAM 38$t$.

If S already exists, it is not regenerated, and the old value of S is retrieved. Also, the encrypted authentication data is possibly not updated. This saves an update of the FLASH memory, and thus preserves the effective lifespan of the FLASH memory, which degrades in performance as it is erased and re-written. However, $S_1$ is recreated on each secondary authentication event. Thus, the values utilized during secondary authentication are different on subsequent executions of the protocol.

A key $S_2$ is then determined in an "exclusive or" bit-wise operation as $S_2 = (S \text{ XOR } S_1)$, 43. The key S is stored in NVRAM 37$t$. As a general case, there is not sufficient NVRAM memory available to support multiple users. Therefore, the secondary authentication mechanism is preferably used for re-authentication of a single user. Alternatively, a table of $S_2$ values encrypted with an encryption key Q is stored in FLASH memory 36$t$, the encryption key Q itself being held in NVRAM 37$t$.

Data necessary for authentication DAUT is then DES-encrypted using the key S, 44$t$, and the encrypted data $[DAUT]_S$ are stored in FLASH memory 36$t$. The authentication data set DAUT comprises information about user identification, personal identification number and initialization vector, and the like. Also, the key $S_1$ is DES-encrypted with the SAK as encryption key, 45$t$, resulting in encrypted $[S_1]_{SAK}$ data. $[S_1]_{SAK}$ is transmitted to the host site 3$h$, where it is DES-decrypted, 46$t$, with SAK as decryption key, which in turn was retrieved from NVRAM 333. Thus, the key $S_1$ is retrieved on the host site 3$h$, and stored in a non-volatile storage medium. The system is now ready for secondary authentication recovery.

Figure 6:
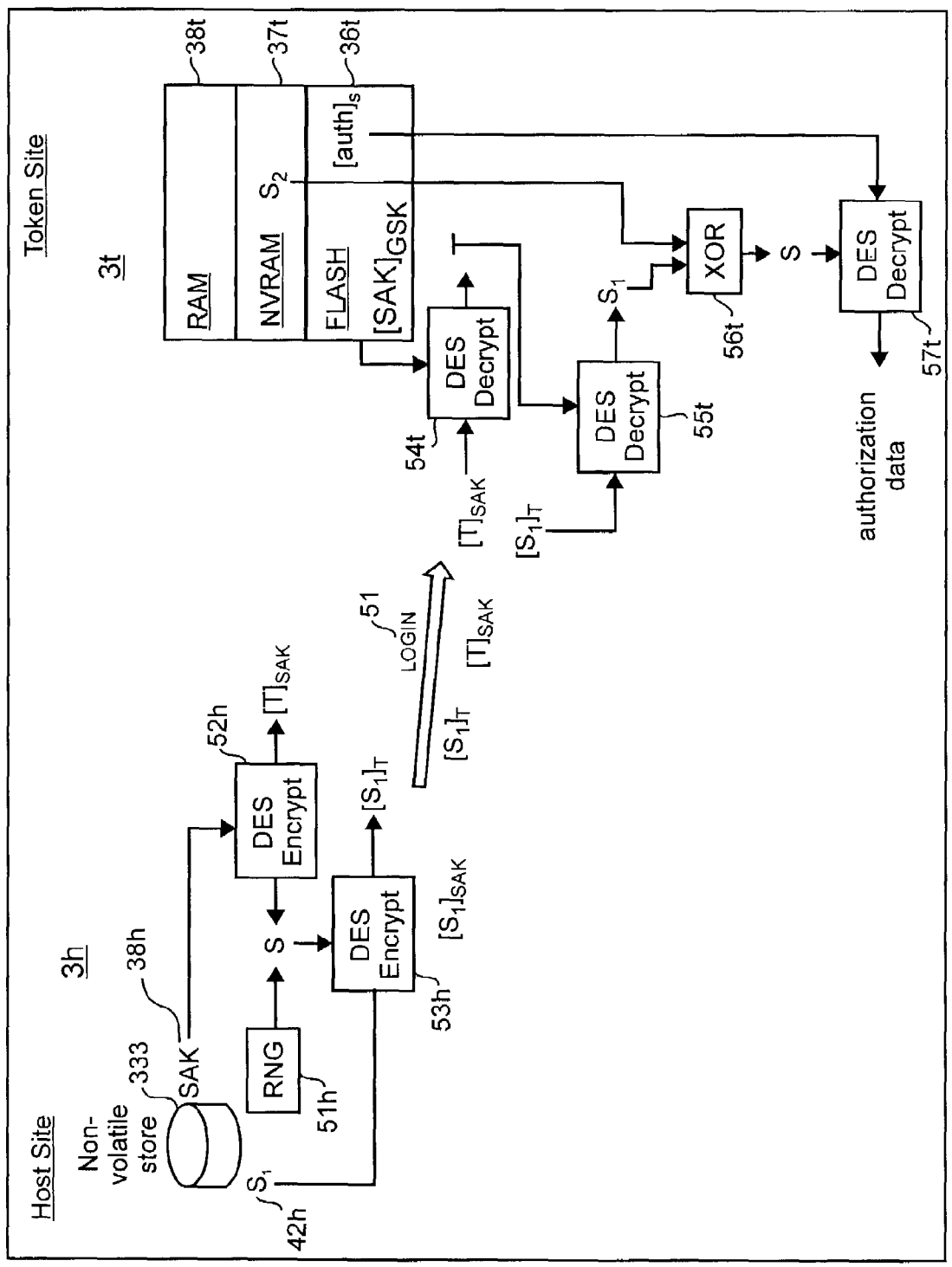
FIG. 6 displays a chart illustrating the procedure of secondary authentication recovery.

Referring now to FIG. 6, an exemplary procedure for secondary authentication recovery according to the preferred embodiment of the instant invention is outlined. When an attempt for secondary authentication is initialized on the host site 3h, a key T is randomly generated on the host site, using a random number generator 51h. The key T is DES-encrypted with SAK as encryption key to result $[T]_{SAK}$, 52h. Further, key T serves itself as DES-encryption key for $S_1$, 53h, to produce $[S_1]_T$. The keys S and $S_1$ are retrieved from NVRAM 333. Together with a login request, the data for $[T]_{SAK}$ and $[S_1]_T$ are transmitted to the token site 3t. The additional encryption with T is performed so that the data request from the host site 3h to the token site 3t requesting secondary authentication recovery is not merely an echo of the data sent from the token site 3t to the host site 3h when setting up for secondary authentication.

On the token site 3t, the SAK is retrieved from FLASH memory 36t, and $[T]_{SAK}$ is DES-decrypted, 58t, to produce the key T. In a second DES decryption step, 55t, the key T itself is used as decryption key to recover $S_1$ from $[S_1]_T$. Next, the key $S_2$ is retrieved from NVRAM 37t, and the logical "exclusive or" bit-wise operation ($S_1$ XOR $S_2$) recovers the key S, 56t, according to the relation $S=(S_1$ XOR $S_2)$. Encrypted authorization data $[DAUT]_S$ is retrieved from FLASH memory, and in a final DES decryption step 57t, the key S is used to decipher authorization data DAUT necessary for secondary authentication. Before login completes, authorization data DAUT is compared to data transmitted in the login request from the host site 3h to the token site 3t, for example user identification, personal identification number, and the like. If a match is detected, the secondary authentication attempt is successful, and the login procedure is completed. Otherwise, the secondary authentication attempt fails, and the login procedure is terminated. Regardless of whether the secondary authentication attempt succeeds or fails, the value of $S_2$ stored in NVRAM 37t is destroyed. Thus, it is only possible to make one secondary authentication attempt.

Since the recovery mechanism described-above has the potential to weaken the system security policy, it is highly advantageous to have a mechanism to control it. It is possible to set up and enable three services with different security levels. On a first level, the recovery functionality is fully disabled. This level of security service is the safest level; however, an event like a power failure requires the physical presence of a SO for re-authentication. On a second level, the recovery functionality is enabled using a hardware device as host: This level of security service allows full recovery following a power failure, given that the process is driven using a secure cryptographic module playing the part of the host. Finally, on a third level the recovery functionality is enabled using a software host: This level of service allows full recovery without additional hardware, but has the weakest security. Security of this system is possibly compromised by breaking the host software in any of a number of different manners, as for example through access to the non-volatile data stored by the host software, by playing a man-in-the-middle attack, or simply by observing the message traffic between the host and token. Given the different levels of security of the different levels of service, a secure system is easily adapted to meet the different needs of different potential users. The security levels are for example encoded in the FPV or TPV, and it is therefore possible that the security level of operation is adjusted by the security officer (SO). Of course, if the three levels are all supported, selection of a level is optionally time dependent wherein on weekends and evenings the second level is selected and during business hours the first level is selected. Therefore, the present invention represents a flexible and adjustable method for secure system re-authentication.

As outlined above, tamper protection is provided by a hardware mechanism, the TDC 2, which automatically clears the NVRAM 333, if any tampering is detected, or if the key card (KC) is removed from its PCI slot. On the token site 3t, three different type of memory systems are operable, which store the following keys and data values: SAK and $[DAUT]_S$ are stored in FLASH memory 36t, and survive power failure and temper detection. The S key is stored in normal RAM 38t; it is destroyed on power failure, and software-wiped on tamper detection. Finally, the $S_2$ key is stored in NVRAM 37t. $S_2$ is destroyed on tamper detection, but survives a power failure for several hours. Thus, in the event of a tamper attempt, only SAK and $[DAUT]_S$ are left exposed, which are themselves not useful to a potential attacker.

Though the KC is described as being within the physical bounds of the security server system, in an alternative embodiment, the KC is outside the physical bounds of the security server system but in a known secure environment. Of course, even the environment need not be substantially secure for some applications.

Although the present invention has been described with respect to a specific embodiment thereof, various changes and modifications are optionally carried out by those skilled in the art without departing from the scope of the invention. Therefore, it is intended that the instant invention encompass such changes and modifications as fall within the scope of the appended claims.

What is claimed is:

1. A security system comprising:
   a token comprising:
      non-volatile random access memory (NVRAM) for storing security data for use during a step of secure authentication;
      an interface for providing communication between the token and a host system when coupled thereto; and
      a processor for performing the steps of:
         receiving authentication data via the interface;
         authenticating the token for performing security functions in response to correct authentication data;
         providing secure information via the interface in response to the correct authentication data;
         storing security data relating to the secure information within the NVRAM of the token in response to correct authentication data; and
         re-authenticating the token for performing security functions using the security data stored in the NVRAM of the token in response to receipt of the secure information after a reset of the token has occurred.

2. A security system according to claim 1, wherein the host system further comprises:
   an interface port for interfacing with the token,
   a host processor for performing instructions in dependence upon instruction data, and
   memory comprising instruction memory for storing of instructions for performing a step of secure re-authentication and non-volatile random access host memory for storing secure information received from the token and for use in secure re-authentication.

3. A security system according to claim 2, wherein the token further comprises:

a tamper detection device for detecting of tampering within the security system and for providing a tamper signal when tampering is detected; and a memory clear circuit for clearing the security data within the token in response to the tamper signal.

4. A security system according to claim 3, wherein the tamper detection device comprises a secure housing and tamper detection circuitry, the non-volatile random access host memory being located within the physical boundaries of the secure housing.

5. A security system according to claim 4, wherein the tamper detection circuitry comprises a circuit for transmitting a tamper signal when then the secure housing is opened.

6. A security system according to claim 4, wherein the tamper detection circuitry comprises a circuit for transmitting a tamper signal when the security system is other than coupled to a ground.

7. A security system according to claim 4, wherein the tamper detection circuitry comprises a circuit for transmitting a tamper signal when the token is removed from a peripheral component interface slot.

8. A security system according to claim 1, comprising:
a voltage source internal to the token for providing a supply voltage to the token for a predetermined amount of time, when an external voltage source providing a supply voltage to the security system is disrupted.

9. A method for secure re-authentication of a secure server comprising the steps of:
transmitting authentication data from a host system to a token for authentication by the token;
receiving key data provided by the token at the host system in response to the transmitted authentication data;
storing the key data on the host system in non-volatile memory thereof;
storing re-authentication data within the token based on the key data provided to the host system;
providing the key data from the host system to the token for secure re-authentication by the token upon a resumption of power following a power failure resulting in a power outage to the token;
retrieving the stored re-authentication data within the token;
comparing the authentication data received from the host to the retrieved re-authentication data within the token; and re-authenticating the host system to the token when the key data is correct key data associated with the stored re-authentication data.

10. A method for secure re-authentication according to claim 9, wherein authentication code is a password.

11. A method for secure re-authentication according to claim 9, wherein memory within the token is powered by a capacitor such that for a predetermined time after external power is other than provided to the token, the memory within the token retains data stored therein.

12. A method for secure re-authentication according to claim 9, wherein the step of storing re-authentication data within the token includes a step of encrypting the re-authentication data.

13. A method for secure re-authentication according to claim 9, further comprising the steps of:
generating on the token the key data.

14. A method for secure re-authentication according to claim 9, comprising the steps of:
generating on the token a first, a second, and a third additional secondary authentication key;
storing on the token at a least one of the first, second and third additional secondary authentication keys in memory; and
securing on the token secondary authorization key data with the at least one of the additional secondary authentication keys stored within memory.

15. A method for secure re-authentication according to claim 14, wherein the third additional secondary authentication key is created in dependence upon the first and the second additional secondary authentication keys.

16. A method for secure re-authentication according to claim 15, wherein the third additional secondary authentication key is created by means of a bit-wise exclusive-or (XOR) operation.

17. A method for secure re-authentication according to claim 12, further comprising the steps of:
creating on the host system an encryption key; and
sending from the host system to the token the encryption key.

18. A method for secure re-authentication according to claim 17, wherein at least one of a first, a second and a third additional secondary authorization keys is encrypted and decrypted with the encryption key.

* * * * *